Figure 1:
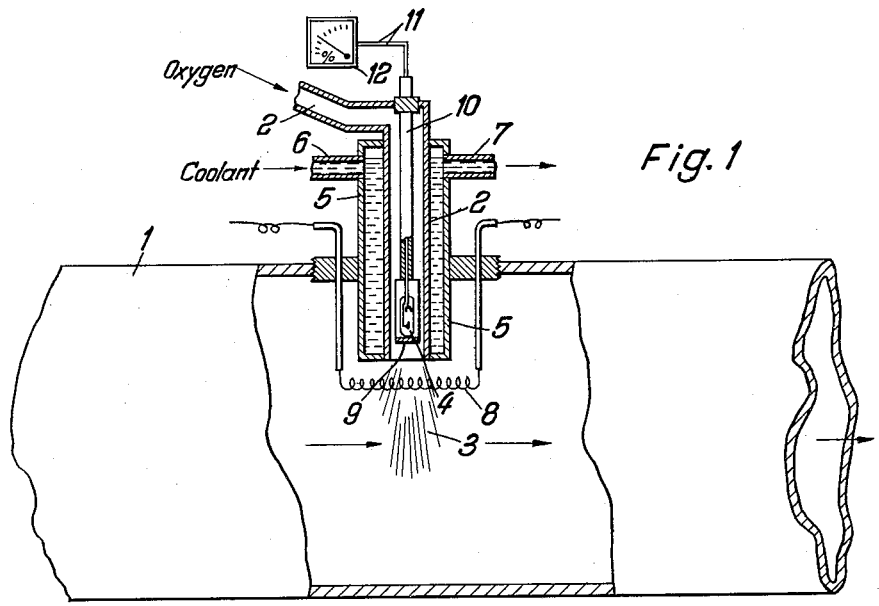

July 10, 1962

L. VON BOGDANDY ETAL
METHOD OF MEASURING THE PROPORTION OF
COMBUSTIBLE MATTER IN GAS STREAMS
Filed July 7, 1959

3,043,668

Inventors:
LUDWIG von BOGDANDY
HEINZ-DIETER PANTKE
BY
Karl F. Ross
AGENT

United States Patent Office 3,043,668
Patented July 10, 1962

3,043,668
METHOD OF MEASURING THE PROPORTION OF COMBUSTIBLE MATTER IN GAS STREAMS
Ludwig von Bogdandy and Heinz-Dieter Pantke, Oberhausen, Germany, assignors to Hüttenwerk Oberhausen A.G., Oberhausen, Rhineland, Germany, a corporation of Germany
Filed July 7, 1959, Ser. No. 825,428
Claims priority, application Germany July 8, 1958
4 Claims. (Cl. 23—232)

Our present invention relates to a method of and an apparatus for measuring the proportion of combustible material in a gas stream and, more particularly, to a process for measuring the percentage of a combustible gas (e.g. carbon monoxide) present in a furnace exhaust gas or the like.

Since a measurement of the completeness of a burning process is a determination of the efficiency of a furnace, it is particularly useful to ascertain the proportion of combustibles in an exhaust gas resulting from the combustion of a fuel in the furnace. Most of the known systems for measuring the quantity or proportion of burnable products (solids or gases) in a gas stream required, heretofore, the withdrawal and chemical analysis of a sample of the exhaust gas by means of relatively expensive, complex apparatus. Since the analyses associated with these measurements were time-consuming, the proportion of combustible matter found in a gas stream at the instant of sampling often differed considerably from that present therein at the time when the results were reported. The aforementioned systems were particularly disadvantageous in any industry wherein a continuous check on a flow process is important and in which a determination of combustibles during operation is essential for achieving a high-quality product (e.g. in the production of steel by a converter process).

Other systems used hitherto utilize the combustion heat from the burning oxidizable components of a gas stream to actuate a thermocouple within the flame; this method is only slightly more accurate than the determination of the presence of an excess of either air or combustibles by a visual observation of the flame.

An object of our invention is, therefore, the provision of a process for the continuous and accurate determination of the combustible content of a gas stream.

A more specific object of the invention is the provision of simple and relatively inexpensive apparatus for carrying out such determination without the necessity of withdrawing a sample from the gas stream.

A feature of our invention resides in the injection of a jet of oxygen or of an oxygen-containing gas into a duct traversed by a stream of a gas containing combustible matter wherein ignition of the combustible occurs as it passes the jet, thus giving rise to a flame at the entrance point of the oxygen. A radiant-energy-sensitive element (e.g. a photocell) is provided to measure the intensity of the resulting flame. Advantageously, according to a more specific feature of the invention, means may be provided for cooling the oxygen-injecting tube to maintain the incoming oxygen at a constant temperature and to eliminate any spurious radiation which would result from the heating of that tube.

A still more specific feature of the invention is the positioning of the radiation-sensing element within the oxygen-injecting tube itself.

We have discovered that there is a linear relationship between the proportion of the solid and/or gaseous combustibles in a gas stream and the intensity of the visible or invisible radiation resulting from localized ignition of the combustible material in a constant stream of oxygen, air or any other oxygen-containing gas. With measurement of either the total radiation or a fraction of the radiated spectrum, the sensitive element may be calibrated directly in terms of percentage of a combustible component or its output (e.g. in electrical units such as millivolts) may be readily converted into such percentage with the aid of suitable charts.

The sensitive element in a system according to our invention may be trained upon the flame itself or upon an incandescent body exposed to the flame. The presence of such incandescent body tends to smooth rapid intensity fluctuations due to distributional factors without materially reducing the ability of the system to respond practically without delay to significant changes in concentration.

Figure 2:
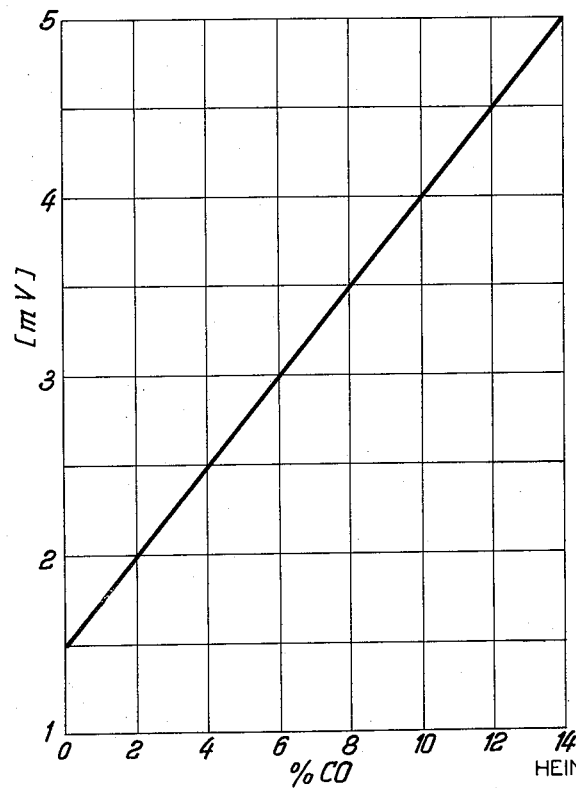

The above and other objects, features and advantages will become more readily apparent from the following description, reference being made to the accompanying drawing in which:

FIG. 1 is a cross-sectional view of an apparatus according to our invention; and FIG. 2 is a graph showing the relationship between combustible content and radiant energy as measured by the apparatus of FIG. 1.

In FIG. 1 we show a pipe 1 which is traversed by a stream of gas containing a quantity of combustible material from a furnace, steel converter or the like, this pipe being provided with an injector tube 2 adapted to introduce oxygen or an oxygen-containing gas into its interior. Tube 2 is surrounded by a water-cooling jacket 5 having a water inlet 6, connected to a suitable source, and a water outlet 7. A photoelectric cell 4 is supported within tube 2 by a rod 10 through which leads 11 extend from the cell 4 to a meter 12 which may be calibrated to read directly in parts (e.g. percent) of combustibles present in the gas stream. The discharge end of tube 2 is shown trained upon an incandescent wire coil 8 which, if desired, may also serve as an igniter for the flame 3 at the beginning of the measuring process. If the gas is hot enough, this flame will spring up spontaneously as oxygen or, more conveniently, air is passed into pipe 1 through tube 2. Near the mouth of tube 2, which acts as a sight for cell 4, there may be provided in front of this cell a filter 9 to select a specific portion of the spectrum radiated by coil 8 and/or by that part of flame 3 upon which this tube is trained. It should be noted that the continuous passage of fresh gas through tube 2 into pipe 1 protects the cell 4 from contamination by soot and other solids entrained by the stream of furnace gas in that pipe, as well as from direct contact with the hot gas.

Meter 12 translates the output of photocell 4 into conveniently readable units. As long as the temperature and the entrance rate of the oxygen are maintained constant, the intensity of the flame 3 will be solely a function of the proportion of combustibles present in the hot gas. This relationship may readily be seen in FIG. 2 wherein the percentage of carbon monoxide present in a furnace gas is plotted against the output of the cell 4 in millivolts. The resulting linear graph illustrates the direct convertibility of intensity measurements into relative concentrations. It will be apparent that different ranges of percentages may thus be measured, with or without inclusion of the zero point in the operative range.

It will be understood that the output of photocell 4 may be utilized for the continuous or periodic adjustment of the controls of an associated furnace, either automatically or through the agency of a human operator reading the meter 12.

We claim:

1. A process for determining the proportion of combustible components in a gas stream having a variable concentration of said combustible components, comprising the steps of injecting an oxygen-containing gas at a substantially constant rate generally transversely into said gas stream, igniting combustible components of the gas stream substantially only at the entrance point of the oxygen-containing gas, and measuring the intensity of at least a portion of the radiant energy emitted by the resulting flame.

2. A process for determining the proportion of combustible components in a gas stream having a variable concentration of said combustible components, comprising the steps of injecting an oxygen-containing gas at a substantially constant rate into said gas stream, igniting combustible components of the gas stream substantially only at the entrance point of the oxygen-containing gas, measuring photoelectrically the intensity of at least a portion of the radiant energy emitted by the resulting flame and converting the obtained electrical output into direct readings of combustible proportion.

3. A process according to claim 2 wherein an incandescent body is exposed to said flame, the radiant energy measured including rays emitted by said body.

4. A process according to claim 1 wherein the oxygen-containing gas is injected at a substantially constant temperature.

References Cited in the file of this patent

UNITED STATES PATENTS

| | | |
|---|---|---|
| 2,448,199 | Vollrath | Aug. 31, 1948 |
| 2,963,353 | Eastman | Dec. 6, 1960 |

FOREIGN PATENTS

| | | |
|---|---|---|
| 491,714 | Great Britain | Sept. 1, 1938 |

OTHER REFERENCES

Scott: "Manufacturing Chemist," 29, 411–416 (1958).